United States Patent [19]

Douglas

[11] 3,827,122

[45] Aug. 6, 1974

[54] CHECK VALVE CAGE APPARATUS AND METHOD OF MAKING SAME

[75] Inventor: Bobby L. Douglas, Dallas, Tex.

[73] Assignee: Dresser Industries, Inc., Dallas, Tex.

[22] Filed: Jan. 19, 1973

[21] Appl. No.: 324,919

[52] U.S. Cl....... 29/157.1 R, 29/527.1, 137/533.13, 425/249

[51] Int. Cl............................................ B21d 53/00

[58] Field of Search................... 29/527.1, 157.1 R; 137/533.11, 533.13; 264/154; 425/249, 110

[56] References Cited
UNITED STATES PATENTS

| | | | |
|---|---|---|---|
| 297,712 | 4/1884 | Peters | 425/249 |
| 2,464,379 | 3/1949 | Courtot | 29/445 |
| 2,524,858 | 10/1950 | Thomas | 425/249 |
| 2,591,174 | 4/1952 | Martin | 137/533.13 |
| 2,682,281 | 6/1954 | Ecker | 137/533.13 |
| 2,937,659 | 5/1960 | Harris et al. | 137/533.13 |
| 3,451,124 | 6/1969 | Steiner et al. | 29/527.1 |
| 3,591,898 | 7/1971 | Stenmo | 425/249 |

*Primary Examiner*—Charles W. Lanham
*Assistant Examiner*—D. C. Crane
*Attorney, Agent, or Firm*—William E. Johnson, Jr.; Michael J. Caddell

[57] ABSTRACT

A check valve cage is fabricated by injecting a reinforced thermal setting plastic through a channel extending along the central longitudinal axis of a cylindrical body. A form pin is inserted through a coaxial longitudinal bore at the other end of said cylindrical body, said bore having an increased diameter central portion for receiving the injected thermoplastic material. After the plastic material has set, lateral flow passages are formed in the wall of the cylindrical body. Shallow drilled holes within the central cavity of the body, upon being filled with the injected plastic material, prevent rotation of the plastic lining of the cage assembly.

5 Claims, 4 Drawing Figures

PATENTED AUG 6 1974

3,827,122

CHECK VALVE CAGE APPARATUS AND METHOD OF MAKING SAME

BACKGROUND OF THE INVENTION

The invention relates generally to valve cages, and in particular, to ball valve cages ordinarily used in oil well plunger pumps wherein a standing check valve and a traveling check valve are ordinarily utilized in combination with a pump plunger and pump barrel to lift fluid to the surface by reciprocal movement of the pump plunger in the barrel.

The prior art includes U.S. Pat. No. 2,937,659 to J. W. Harris et al, asssigned to the assignee of the present invention, which discloses a ball valve cage with an elastomeric guide which is molded into the valve cage but which requires intricate mold form pieces to mold intricate shapes into the guide to provide the necessary flow passages past the valve. Elastomers have disadvantages in that fluids found in oil wells often attack the elastomer and cause the elastomer to swell. Such swelling can bind the valve and cause the valve to become inoperative. In addition, natural gas in the fluids may permeate the elastomer, and upon reduced pressure in the valve cage, may expand and cause blisters which bind the valve and render it inoperative.

It is therefore the primary object of the present invention to provide an improved valve cage with a plastic guide resistant to attack from natural gas and hydrocarbons; and It is yet another object of the invention to provide a new and improved method for manufacturing a valve cage.

SUMMARY OF THE INVENTION

The objects of the invention are accomplished, generally, by a check valve housing having a longitudinal bore, a valve seat in the housing in axial alignment with the bore, a tubular plastic valve guide in the bore, stop means in the bore and a valve in the guide intermediate the stop means and the valve seat which is engageable with the valve seat and moveable away from the valve seat. As an additional feature of the invention, an improved method is provided for fabricating the plastic valve guide within the bore by injecting a thermal setting plastic material into a longitudinal bore of the cage housing in surrounding relationship to a mold pin temporarily positioned within the interior of the bore.

These and other objects, features and advantages of the present invention will be more readily appreciated from a reading of the following detailed specification, and drawing, in which.

Figure 1:
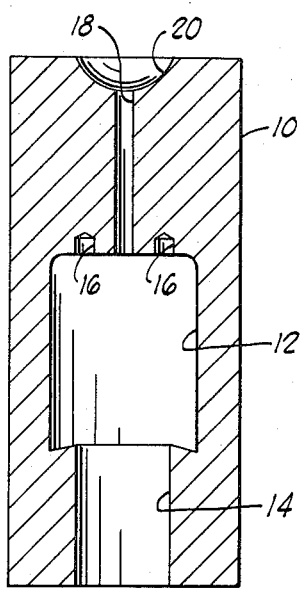
FIG. 1 is a longitudinal sectional view of a semi-finished valve cage according to the invention.

Referring now to the drawings in more detail, especially to FIG. 1, a semi-finished, cylindrical valve cage 10 is illustrated as having a longitudinal bore 12 which is provided to receive a molded plastic lining described in detail hereinafter. The longitudinal bore 12 has a lower portion 14 of reduced diameter. A plurality of shallow drilled holes 16, for example, two, in the upper end of the longitudinal bore 12 form cavities to receive a portion of the injected thermoplastic material which serve to keep the plastic guide in place and prevent the rotation thereof. A reduced diameter screw hole 18 is drilled from the upper surface of the cylindrical body 10 to be in communication with the central longitudinal bore 12 and is coaxial therewith. A mold pin sealing surface 20 is formed surrounding the upper end of the screw hole 18 for purposes hereinafter described.

Figure 2:
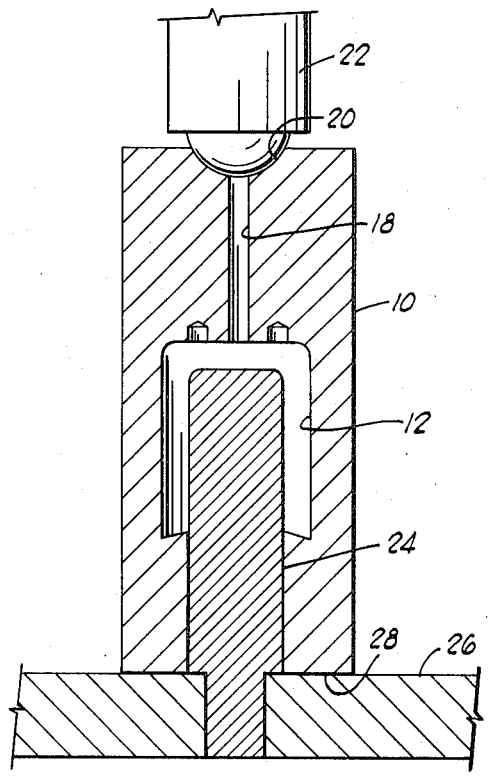
FIG. 2 is a longitudinal sectional view of a semi-finished valve cage according to the invention and including mold parts for molding the valve guide plastic lining according to the invention.

Referring now to FIG. 2, the semi-finished cylindrical body 10 illustrated in FIG. 1 is shown with a mold injection pin 22 in sealing engagement with surface 20 on the cylindrical body 10. A form pin 24 is shown in place in the reduced diameter portion 14 and the longitudinal bore 12 and is positioned to form the internal configuration of the plastic guide to be molded in the semi-finished body 10. The form pin 24 is shown mounted in a mold plate 26 which also locates the end 28 of the semi-finished cylindrical body 10.

Figure 3:
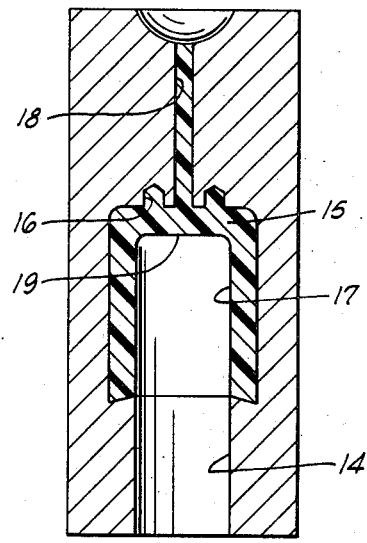
FIG. 3 is a longituindal sectional view of a semi-finished valve cage according to the invention subsequent to the injection of the thermoplastic setting material.

In the fabrication process using the apparatus illustrated in FIG. 2, and with the mold parts 22, 24 and 26 in place, the thermoplastic material is injected through the mold pin 22 and through the screw hole 18 to fill the longitudinal bore 12 around the mold pin 24 to thereby form the plastic guide 15 as is illustrated in FIG. 3.

Referring now to FIG. 3, the semi-finished cage assembly 10 is illustrated with the mold pins 22 and 24 removed and the thermoplastic lining 15 in place on the interior of the longitudinal bore 12. It should be appreciated that the walls of the reduced bore 14 are thus aligned with the interior wall 17 of the plastic lining 15. There is also provided an upper stop 19 against which the ball 38 (illustrated in FIG. 4) can impinge when it is removed from the valve seat 36, also illustrated in FIG. 4. The drilled holes 16 in the upper portion of the plastic lined upper bore 12 are also filled with the thermoplastic setting material to provide a locking of the lining 15 against rotation within the bore 12. It should also be appreciated that the thermoplastic material within the screw hole 18 also provides a means of locking the lining 15 in place within the interior of the cylindrical body 10.

Figure 4:
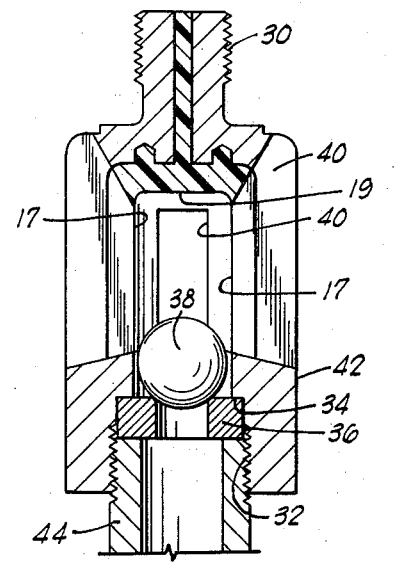
FIG. 4 is a longitudinal sectional view of a completed valve assembly according to the invention.

Referring now to FIG. 4, the finished valve assembly is shown as having a threaded connection 30 which can be formed in any conventional manner from the upper end of the cylindrical body 10. Another suitable thread 32 is formed at the lower end of the housing 10 within the bore 14 and a shoulder 34 is formed to receive the valve seat 36. A ball valve 38 or other similar type valve may be utilized within the cage. If desired, a valve built in accordance with my copending U.S. patent application, Ser. No. 301,557, filed Oct. 27, 1972, may also be utilized within the cage according to the present invention. The valve seat 36 is held in place by a suitably threaded part 44 which is threaded into the internal threads 32. Lateral flow passages or ports 40 are formed through the wall of the cage, for example, by machining, to allow fluid to pass through the valve seat 36 and out through the flow passages 40 whenever the ball 38 is off the seat 36.

In the operation of the completed apparatus as illustrated in FIG. 4, it should be appreciated that as the fluid pressure builds up within the threaded pipe 44 beneath the valve 38, the valve 38 is lifted from the valve seat 36 and the fluid passes through the bore 12 and out through the lateral flow passages 40. In so doing, the ball 38 is guided along the plastic surfaces 17 of the plastic lining 15 and can impinge upon the upper stop 19, also being fabricated from plastic, without causing any appreciable damage thereto.

It should be appreciated that while the plastic lining 15 can be made of various thermoplastic setting materials, or other various plastics, the preferred embodiment contemplates that it be formed of 6/10 nylon with 60 percent fiber glass filler. Additional examples of suitable materials include nylon 6/60 with 60 percent fiber glass filler and nylon 6/12 with 60 percent fiber glass filler.

Thus there has been illustrated and described herein the preferred embodiments of the present invention with respect to a new and improved valve cage assembly and method of making same. However, obvious modifications of the preferred embodiments illustrated and described herein will be obvious to those skilled in the art from a reading of the foregoing specification. For example, instead of having the screw hole 18 in coxial alignment with the bores 12 and 14, the screw hole 18 can be offset or angled from the longitudinal axis of the bore 12 if desired. Likewise, the drill holes 16 can be eliminated if there is no need to prevent the plastic lining from rotating within the chamber 12. Again, in lieu of the lateral ports 40 being machined into the side portions of the cage, flow ports can also be established in the uppermost section of the cage if desired.

The embodiments of the invention in which an exclusive property or privilege is claimed are defined as follows:

1. A method for fabricating an internal plastic lining in the bore of a valve cage, comprising:

forming a cylindrical, longitudinal bore within a valve cage housing, said bore having an end portion with diameter reduced from the diameter of the remainder of said bore;

inserting a cylindrical mold pin into said bore a distance less than the length of said bore but greater than the length of said end portion of said bore, said pin having a diameter substantially equal to the diameter of said end portion of said bore;

injecting a thermoplastic material into said bore around said mold pin; and, forming at least one fluid passageway through said housing and said plastic lining in communication with said bore.

2. A method of forming a cage-type valve assembly having a ball valve element, a valve seat, and a plastic cage liner therein, said method comprising:

forming a cylindrical ball valve cavity within an unfinished valve cage housing member, said cavity passing partially through said housing member and having an open end and a solid end;

forming in said valve cavity a cylindrical restricted bore passage comprising annular inner shoulder means in the open end of said valve cavity;

forming an injection channel through said valve cage housing member intersecting said valve cavity away from said restricted bore passage;

inserting a cylindrical member snugly into said restricted bore passage substantially sealing said bore passage and forming an annular space between said member and the sides of said valve cavity and forming an axial space between the end of said member and the solid end of said valve cavity;

injecting molten thermoplastic material through said injection channel and filling said annular space and said axial space with said material;

allowing said material to solidify and then removing said cylindrical member from said bore passage and valve cavity;

machining openings through the wall of said cage housing member and said annular material, said openings communicating with said valve cavity; and inserting a ball valve, cylindrical valve seat, and retaining means into said restricted bore passage.

3. The method of claim 2 further comprising the step of forming locking means between said plastic cage liner and said housing member by drilling one or more holes in the internal wall of said housing member in said valve cavity area prior to inserting said cylindrical member into said bore passage, and allowing molten thermoplastic material to flow into said holes during said injecting step.

4. The method of claim 3 further comprising the step of forming additional locking means between said cage liner and said housing member by filling said injection channel with thermoplastic material during said injecting step and retaining at least a portion of said material therein after it has solidified.

5. The method of claim 4 further comprising prior to inserting said ball valve, valve seat, and retaining means into said restricted bore passage, the additional step of forming an enlarged counterbore partially along said restricted bore passage, said counterbore arranged to receive said valve seat and retaining means in abutting engagement with the remainder of said restricted bore passage.

* * * * *